United States Patent
Hoshina et al.

(10) Patent No.: US 8,994,485 B2
(45) Date of Patent: Mar. 31, 2015

(54) MAGNETIC-ANISOTROPIC PLASTICALLY DEFORMED BODY, METHOD FOR PRODUCING THE SAME, AND ELECTROMAGNETIC APPARATUS USING THE SAME

(71) Applicant: Keihin Corporation, Tokyo (JP)

(72) Inventors: Hidehiro Hoshina, Miyagi-ken (JP); Toshiro Harakawa, Utsunomiya (JP); Keiichi Koyama, Kagoshima (JP); Kohki Takahashi, Sendai-shi (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 13/832,940

(22) Filed: Mar. 15, 2013

(65) Prior Publication Data
US 2013/0256574 A1    Oct. 3, 2013

(30) Foreign Application Priority Data
Mar. 30, 2012    (JP) .................... 2012-082113

(51) Int. Cl.
| H01F 3/00 | (2006.01) |
| H01F 7/08 | (2006.01) |
| F16K 7/00 | (2006.01) |
| H01F 41/02 | (2006.01) |
| F16K 27/02 | (2006.01) |
| F16K 31/06 | (2006.01) |

(52) U.S. Cl.
CPC *F16K 7/00* (2013.01); *H01F 41/02* (2013.01); *H01F 7/081* (2013.01); *H01F 41/024* (2013.01); *F16K 27/029* (2013.01); *F16K 31/0655* (2013.01)

USPC .......................... 335/279; 251/129.15

(58) Field of Classification Search
USPC .......... 335/220–229, 279, 296, 302; 251/129.15; 400/100, 108, 300
See application file for complete search history.

(56) References Cited

U.S. PATENT DOCUMENTS

| 5,536,334 A * | 7/1996 | Kobayashi et al. ........... 148/101 |
| 2008/0253917 A1* | 10/2008 | Hirose et al. ................ 419/66 |
| 2010/0261038 A1* | 10/2010 | Imaoka et al. ............... 428/800 |
| 2011/0266894 A1* | 11/2011 | Yamashita et al. .......... 310/49.53 |
| 2012/0145944 A1* | 6/2012 | Komuro et al. ........ 252/62.51 R |
| 2013/0038420 A1* | 2/2013 | Uozumi et al. ............... 336/233 |
| 2013/0106230 A1* | 5/2013 | Morita et al. ........... 310/156.66 |

FOREIGN PATENT DOCUMENTS

| JP | 10-158741 | 6/1998 |
| JP | 11-108231 | 4/1999 |

\* cited by examiner

*Primary Examiner* — Bernard Rojas
(74) *Attorney, Agent, or Firm* — Rankin, Hill & Clark LLP

(57) ABSTRACT

A material containing a soft magnetic substance is subjected to a plastic deformation such as a roll processing to obtain a rod-shaped body. Then, the rod-shaped body or a shaped body obtained by processing the rod-shaped body into a shape other than a flat plate shape is subjected to a heat treatment in the presence of a magnetic field. The rod-shaped body or the shaped body is made magnetic-anisotropic by the heat treatment thereby to obtain a magnetic-anisotropic plastically deformed body.

20 Claims, 8 Drawing Sheets

MAGNETIC-ANISOTROPIC PLASTICALLY DEFORMED BODY, METHOD FOR PRODUCING THE SAME, AND ELECTROMAGNETIC APPARATUS USING THE SAME

CROSS-REFERENCE TO RELATED APPLICATION

This application is based upon and claims the benefit of priority from Japanese Patent Application No. 2012-082113 filed on Mar. 30, 2012, the contents of which are incorporated herein by reference.

BACKGROUND OF THE INVENTION

1. Field of the Invention

The present invention relates to a magnetic-anisotropic plastically deformed body, which is plastically deformed but exhibits a magnetic anisotropy, a method for producing the same, and an electromagnetic apparatus using the same.

2. Description of the Related Art

An electromagnetic valve, which is one of electromagnetic apparatuses, has an electromagnetic coil (solenoid), and fixed and movable cores. The fixed and movable cores each contain a soft magnetic substance, and are magnetized and demagnetized depending on an electromagnetic action of the electromagnetic coil. When the electromagnetic coil is energized to generate a magnetic field, the fixed and movable cores are magnetized, whereby a valve element disposed on the movable core is displaced, and then the electromagnetic valve of a normally closed type is opened, and the electromagnetic valve of a normally open type is closed. When the energization is stopped to eliminate the magnetic field, the fixed and movable cores are demagnetized, whereby the valve element returns to the original position, and then the electromagnetic valve of the normally closed type is closed, and the electromagnetic valve of a normally open type is opened.

In the electromagnetic valve having such a structure, there is a demand for reducing the time from the start until the end of the open/close operation, i.e. for increasing the response speed, after the switching from the energized state to the energization stop state or from the energization stop state to the energized state. This demand may be satisfied by controlling a magnetic flux flow in the magnetization of the fixed or movable core.

From this viewpoint, Japanese Laid-Open Patent Publication No. 11-108231 proposes a pseudo-rod-like body, which is formed by radially arranging a plurality of unidirectional electromagnetic steel sheets on a base made of an electromagnetic steel sheet having a predetermined shape. However, the unidirectional electromagnetic steel sheets have flat plate shapes as indicated by the name, so that a difficult complicated procedure is required for radially arranging the sheets. Furthermore, the unidirectional electromagnetic steel sheets are expensive, resulting in high cost.

Furthermore, it is necessary to process the base into a predetermined shape suitable for the flat plate shapes of the unidirectional electromagnetic steel sheets. Also, this processing results in high cost.

In addition, the unidirectional electromagnetic steel sheets and the base of the electromagnetic steel sheet cannot be bonded with a sufficient adhesion force by an adhesive. Therefore, the pseudo-rod-like body may exhibit an insufficient durability against application of an impact load on the adhesive in the open/close operation.

Japanese Laid-Open Patent Publication No. 10-158741 proposes that, in a recrystallization treatment after a heavily cold rolling process, a magnetic field is applied parallel to the rolling direction to improve the magnetic property of the unidirectional electromagnetic steel sheet. However, this procedure can be used only for such a flat plate-shaped member, and thus a product cannot be obtained with a shape other than the flat plate shape. Consequently, the above problems cannot be solved by this procedure.

SUMMARY OF THE INVENTION

A general object of the present invention is to provide a magnetic-anisotropic plastically deformed body having an arbitrary shape other than a flat plate shape.

A major object of the invention is to provide a magnetic-anisotropic plastically deformed body exhibiting a magnetic anisotropy with a better magnetic property in a desired direction than in the other directions.

Another object of the invention is to provide a method for producing the magnetic-anisotropic plastically deformed body.

A further object of the invention is to provide an electromagnetic apparatus containing the magnetic-anisotropic plastically deformed body.

According to an aspect of the invention, there is provided a magnetic-anisotropic plastically deformed body comprising a plastically deformed body obtained by processing a material containing a soft magnetic substance into a shape other than a flat plate shape, the plastically deformed body exhibiting a magnetic anisotropy.

Thus, the magnetic-anisotropic plastically deformed body of the present invention can have a desired shape other than a flat plate shape. For example, since the magnetic-anisotropic plastically deformed body can have a substantially cylindrical (rod-like) shape, the magnetic-anisotropic plastically deformed body can be used as a constituent member of a magnetic circuit, such as a fixed or movable core or the like without a particular processing for obtaining the rod shape, unlike the conventional techniques.

In other words, in the present invention, in order to produce the cylindrical core, it is not necessary to perform the process of radially arranging flat plate-shaped magnetic members, stacking the members, or bonding the members to a base. Thus, in the invention, the cylindrical core having excellent durability can be produced at low cost without the complicated processes.

In a typical embodiment of the present invention, the magnetic-anisotropic plastically deformed body has one magnetization easy axis and exhibits a uniaxial magnetic anisotropy. In the unidirectional electromagnetic steel sheet used in the conventional technique, the magnetization easy axis is oriented along the direction of rolling (spreading). In contrast, in the present invention, the magnetization easy axis can be oriented in a desired (arbitrary) direction. Thus, for example, the direction of the magnetic field can be significantly easily aligned with the direction of the magnetization easy axis. Consequently, the layout freedom of the magnetic circuit can be improved.

The magnetic-anisotropic plastically deformed body preferably has a crystal grain size corresponding to a grain size number of 3 to 9 in the metal structure. In this case, the magnetic-anisotropic plastically deformed body exhibits an excellent toughness and a sufficient magnetic anisotropy.

As described above, the magnetic-anisotropic plastically deformed body contains a soft magnetic substance. Specific preferred examples of such soft magnetic substances include silicon steels and Fe—Al alloys.

The shape of the magnetic-anisotropic plastically deformed body may be, for example, a rod (substantially cylindrical) shape. In this case, as described above, the magnetic-anisotropic plastically deformed body can be used as the fixed or movable core or the like without the particular processing.

The magnetic-anisotropic plastically deformed body can be obtained by plastically deforming the material and subjecting the deformed material to a heat treatment in the presence of a magnetic field.

According to another aspect of the present invention, there is provided a method for producing a magnetic-anisotropic plastically deformed body, which contains a soft magnetic substance and exhibits a magnetic anisotropy. The method comprises the steps of plastically deforming a material containing the soft magnetic substance to obtain a rod-shaped body, and subjecting the rod-shaped body or a shaped body obtained by processing the rod-shaped body into a shape other than a flat plate shape, to a heat treatment in the presence of a magnetic field to achieve the magnetic anisotropy, thereby obtaining the magnetic-anisotropic plastically deformed body. The phrase "processing the rod-shaped body into a shape other than a flat plate shape" may be a cutting process, a grinding process, plastic deforming process, etc. Two or more of the processes may be used in combination.

The heat treatment is preferably carried out within a temperature range from a recrystallization temperature to (the recrystallization temperature+100° C.). In this case, recrystallization proceeds in the metal structure of the rod-shaped body or the shaped body. Therefore, a dislocation in the metal structure, generated in the plastically deforming process, can be eliminated. Furthermore, when the heat treatment is performed within the temperature range, the magnetic anisotropy can be sufficiently increased. The heat treatment is more preferably carried out within a temperature range from (the recrystallization temperature+20° C.) to (the recrystallization temperature+80° C.)

In the plastically deforming step, the material is preferably processed at a processing rate of 10% to 40%. When the processing rate is not within this range, a satisfactory magnetic anisotropy cannot be obtained. The processing rate is defined as a cross-sectional area reduction ratio before and after the plastically deforming step.

In a typical embodiment, the magnetic-anisotropic plastically deformed body produced by the method has one magnetization easy axis and exhibits a uniaxial magnetic anisotropy. The magnetization easy axis can be oriented in a desired (arbitrary) direction by controlling the direction of the magnetic field applied to the rod-shaped body or the shaped body in the heat treatment. The magnetic field preferably has an intensity of 0.5 T or more in order to achieve a satisfactory magnetic anisotropy in the magnetic-anisotropic plastically deformed body.

As described above, preferred examples of the soft magnetic substances include silicon steels and Fe—Al alloys.

The magnetic-anisotropic plastically deformed body can be produced with a rod shape by subjecting the rod-shaped body to the heat treatment in the presence of the magnetic field.

According to a further aspect of the invention, there is provided an electromagnetic apparatus comprising a magnetic circuit. The magnetic circuit contains an electromagnetic coil and a soft magnetic member. The electromagnetic coil generates a magnetic field when the electromagnetic coil is energized, and the magnetic field disappears when the energization is stopped. The soft magnetic member is magnetized and demagnetized respectively by the generation and disappearance of the magnetic field. The soft magnetic member is the above-described magnetic-anisotropic plastically deformed body.

By incorporating the magnetic-anisotropic plastically deformed body, the magnetic circuit can be magnetized and demagnetized in response to the generation and disappearance of the magnetic field in a short time. Thus, for example, a solenoid valve (electromagnetic valve) incorporating such a magnetic circuit has an improved magnetic efficiency and thus an increased response speed of the open/close operation.

The above and other objects, features, and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENTS

A preferred embodiment of a magnetic-anisotropic plastically deformed body and the production method according to the present invention will be described in detail below in relation to an electromagnetic apparatus containing the magnetic-anisotropic plastically deformed body with reference to the accompanying drawings.

First, the magnetic-anisotropic plastically deformed body will be described below.

Figure 1C:
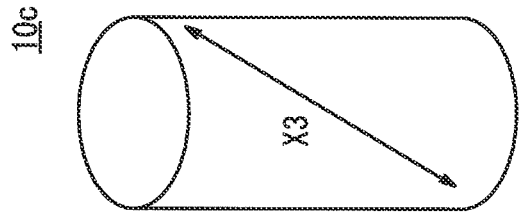
FIGS. 1A to 1C are overall schematic perspective views of magnetic-anisotropic plastically deformed bodies according to an embodiment of the present invention.
Figure 1B:
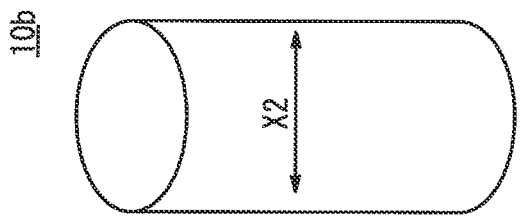
Figure 1A:
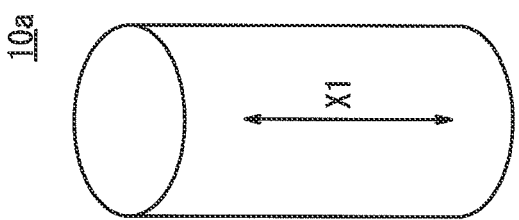

FIGS. 1A to 1C are overall schematic perspective views of magnetic-anisotropic plastically deformed bodies 10a to 10c according to an embodiment of the invention. The magnetic-anisotropic plastically deformed bodies 10a to 10c have an approximately cylindrical shape, i.e. a rod shape. Thus, the magnetic-anisotropic plastically deformed bodies 10a to 10c have a shape other than flat plate shapes.

The magnetic-anisotropic plastically deformed bodies 10a to 10c each are made of a soft magnetic substance, and thereby have a relatively low coercivity and a relatively high permeability. Therefore, when an external magnetic field is generated, the magnetic-anisotropic plastically deformed bodies 10a to 10c are readily magnetized by the magnetic field. When the magnetic field disappears, the magnetic-anisotropic plastically deformed bodies 10a to 10c are readily demagnetized. Preferred examples of such soft magnetic substances include silicon steels and Fe—Al alloys.

The magnetization easy axes of the magnetic-anisotropic plastically deformed bodies 10a to 10c are oriented in the directions of the arrows X1, X2, and X3, respectively. Thus, the magnetization easy axis of the magnetic-anisotropic plastically deformed body 10a shown in FIG. 1A is oriented in the longitudinal direction, that of the magnetic-anisotropic plastically deformed body 10b shown in FIG. 1B is oriented in a radial direction thereof, and that of the magnetic-anisotropic plastically deformed body 10c shown in FIG. 1C is oriented in the direction tilted at about 45° to the longitudinal and radial directions.

The magnetization easy axis is parallel to a direction, in which magnetic domains are easily oriented under a magnetic field. Thus, the magnetic-anisotropic plastically deformed body 10a exhibits a higher magnetic permeability in the longitudinal direction than in the other directions. Meanwhile, the magnetic-anisotropic plastically deformed body 10a exhibits a lower magnetic coercivity in the longitudinal direction than in the other directions.

Furthermore, the magnetic-anisotropic plastically deformed body 10b exhibits a higher magnetic permeability and a lower magnetic coercivity in the radial direction than in the other directions. The magnetic-anisotropic plastically deformed body 10c exhibits a higher magnetic permeability and a lower magnetic coercivity in the direction tilted at about 45° to the longitudinal and radial directions than in the other directions. Consequently, the magnetic-anisotropic plastically deformed bodies 10a to 10c exhibit a magnetic anisotropy.

As shown in FIGS. 1A to 1C, the magnetic-anisotropic plastically deformed bodies 10a to 10c each have one magnetization easy axis. Therefore, the magnetic-anisotropic plastically deformed bodies 10a to 10c exhibit a uniaxial magnetic anisotropy.

The magnetic-anisotropic plastically deformed bodies 10a to 10c have the same shape and size. However, the magnetic-anisotropic plastically deformed bodies 10a to 10c are different in the directions of the magnetization easy axes. Thus, in this embodiment, the magnetization easy axes are oriented in the different directions in the plastically deformed bodies having the same shape and size.

The direction of the magnetization easy axis is not limited to the directions of the arrows X1 to X3 shown in FIGS. 1A to 1C, and may be another desired (arbitrary) direction. For example, the magnetization easy axis may be oriented in the direction tilted at about 30° to the longitudinal direction and at about 60° to the radial direction.

Thus, in this embodiment, the direction of the magnetization easy axis (i.e. the direction in which an excellent magnetic property is achieved) can be adjusted to a desired (arbitrary) direction in order to provide an excellent magnetic property. Consequently, in a magnetic circuit containing the magnetic-anisotropic plastically deformed body as a magnetic component, an excellent magnetic property can be achieved in a desired direction by orienting the magnetization easy axis in the desired direction.

The magnetic-anisotropic plastically deformed bodies 10a to 10c are shaped bodies obtained by plastically deforming a material. Therefore, crystal grains in the metal structure of the material may be spread in the plastically deforming step.

Crystal grains in the magnetic-anisotropic plastically deformed bodies 10a to 10c (i.e. spread crystal grains) preferably have a crystal grain size corresponding to a grain size number of 3 to 9. The grain size number is an index of the grain size, and a larger grain size number indicates a smaller grain size, as well-known in the art.

When the grain size number is smaller than 3 (i.e., the grain size is large), the magnetic-anisotropic plastically deformed bodies 10a to 10c may be insufficient in mechanical properties, particularly toughness. A magnetic circuit using such magnetic-anisotropic plastically deformed bodies 10a to 10c as a magnetic component may be insufficient in durability. On the other hand, when the grain size number is larger than 9 (i.e., the grain size is small), the magnetic-anisotropic plastically deformed bodies 10a to 10c accordingly increase in coercivity, and thus, they cannot be easily used as an appropriate component such as a yoke or a core.

The magnetic-anisotropic plastically deformed bodies 10a to 10c may be produced in the following manner.

First, a material containing a soft magnetic substance such as a silicon steel or an Fe—Al alloy is subjected to a plastic forming thereby to deform the material, whereby a rod-shaped body 20 (see FIG. 2) is obtained. The material may have a rod shape. The plastic deforming is a process for plastically deforming the material, and specific examples of the process include rolling and press working.

In a case where the material having a rod shape is roll-processed to obtain the rod-shaped body 20, the cross-sectional area of the rod-shaped body 20 is smaller than that of the unprocessed material. In other words, in this case, the cross-sectional area is reduced by the plastic deforming. The reduction ratio of the cross-sectional area is referred to also as the processing rate. Particularly in the rolling process, it is referred to also as the area reduction. Thus, the processing rate is defined by the following expression (1).

$$\text{Processing rate [\%]} = \{(S_0 - S)/S_0\} \times 100 \qquad (1)$$

In the expression (1), $S_0$ represents the cross-sectional area of the material before the rolling process, and S represents the cross-sectional area of the shaped body after the rolling process.

The processing rate is preferably 10% to 40%. If the processing rate is less than 10%, the deformation amount is not sufficient, and it is difficult to perform recrystallization, as described later, thereby resulting in an insufficient magnetic anisotropy. On the other hand, if the processing rate is more than 40%, the shaped body cannot be readily affected by a magnetic field in the recrystallization. In other words, a great force of the magnetic field is required for achieving the sufficient magnetic anisotropy. Therefore, also the processing rate of more than 40% results in an insufficient magnetic anisotropy.

Furthermore, when the processing rate is within the above preferred range, the crystal grain size number of the rod-shaped body 20 can be easily controlled within the range of 3 to 9.

Figure 2:
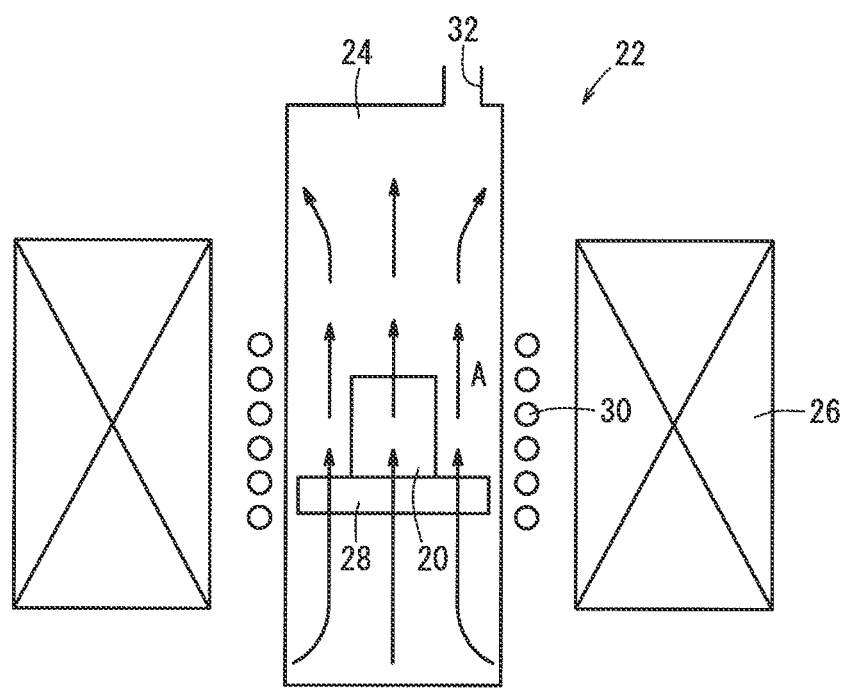
FIG. 2 is a schematic vertical cross-sectional view of main parts of a heat treatment apparatus for producing the magnetic-anisotropic plastically deformed bodies.

In the production of the magnetic-anisotropic plastically deformed bodies 10a to 10c shown in FIGS. 1A to 1C, the obtained rod-shaped body 20 may be subjected to a recrystallization treatment in the presence of a magnetic field as shown in FIG. 2.

A heat treatment apparatus 22 shown in FIG. 2 will be described below. The heat treatment apparatus 22 contains a heat treatment furnace 24 and an electromagnetic coil 26 surrounding the heat treatment furnace 24.

A base 28 for supporting the rod-shaped body 20 is disposed in the heat treatment furnace 24. The heat treatment furnace 24 is equipped with a heater 30, and the temperature of the heat treatment furnace 24 is elevated by the heater 30.

An exhaust hole 32 is formed on an upper portion of the heat treatment furnace 24 shown in FIG. 2. The exhaust hole 32 is connected with an exhausting means such as a pump (not shown). The heat treatment furnace 24 can be evacuated by the exhausting means, and the internal space of the heat treatment furnace 24 can be in a vacuum atmosphere, for example.

Though the vacuum atmosphere may be utilized to obtain a clean lustered surface, the atmosphere in the heat treatment furnace 24 is not limited to the vacuum atmosphere. For example, the atmosphere in the heat treatment furnace 24 may be a reducing atmosphere such as a hydrogen atmosphere, an oxidizing atmosphere such as an air atmosphere, or the like, as long as the atmosphere does not act to deteriorate the magnetic property.

The electromagnetic coil 26 generates a magnetic field in the heat treatment furnace 24. In this embodiment, when the electromagnetic coil 26 is energized, the magnetic field is generated along the arrow A direction.

A heat treatment is carried out in the heat treatment apparatus 22 as follows.

Figure 3A:
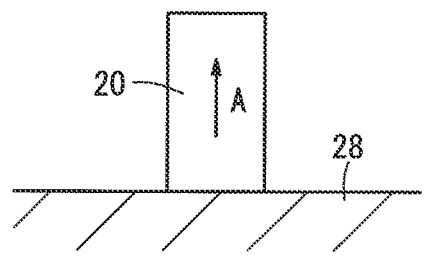
FIGS. 3A to 3C are partial plan views of fixed rod-shaped bodies for producing the magnetic-anisotropic plastically deformed bodies of FIGS. 1A to 1C.
Figure 3B:
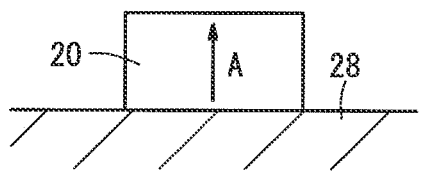
Figure 3C:
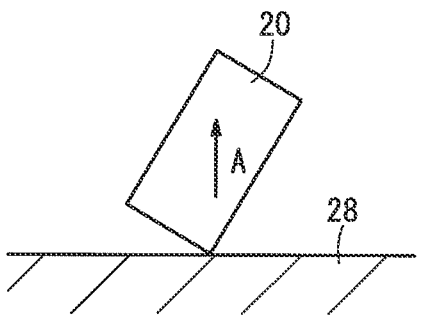

First, the rod-shaped body 20 is fixed to the base 28. In FIGS. 2 and 3A, the longitudinal direction of the rod-shaped body 20 is adjusted parallel to the direction of the magnetic field. The direction of the magnetization easy axis is controlled by adjusting the inclination angle of the rod-shaped body 20 with respect to the direction of the magnetic field. This control will be described hereinafter.

Next, the exhausting means is actuated, whereby the internal space of the heat treatment furnace 24 is placed in a negative pressure state. In this state, the electromagnetic coil 26 is energized to generate the magnetic field in the arrow A direction of FIG. 2, and the heater 30 is energized to elevate the temperature in the heat treatment furnace 24. Thus, the rod-shaped body 20 is subjected to the heat treatment.

The temperature of the heat treatment is preferably at least a temperature at which the recrystallization can be caused. At such a temperature, a dislocation in the metal structure of the rod-shaped body 20, generated in the plastic deforming, can be eliminated.

The recrystallization temperature can be determined by subjecting the rod-shaped bodies 20 to the heat treatments at various temperatures and then measuring the Vickers hardnesses of the rod-shaped bodies 20. In the measurement, the Vickers hardness is drastically lowered at the recrystallization temperature.

Figure 4:
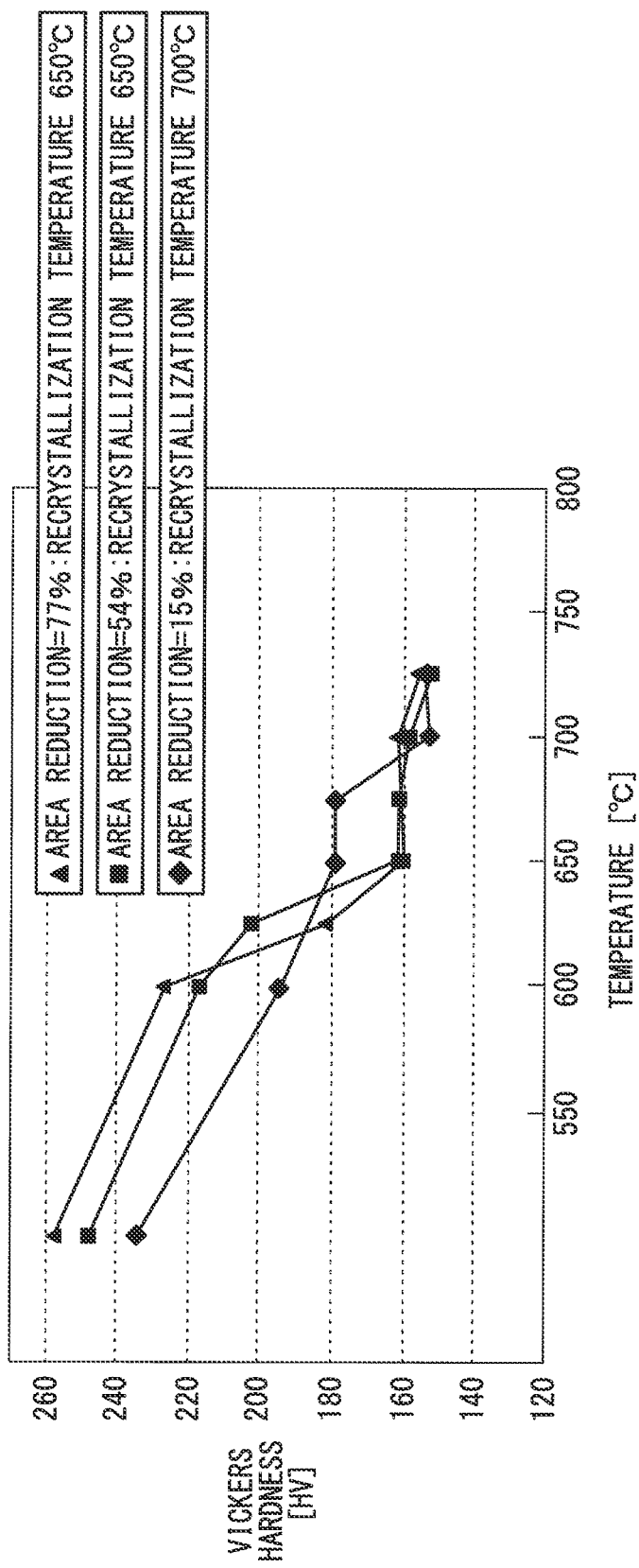
FIG. 4 is a graph for illustrating the Vickers hardness measurement results of rod-shaped bodies deformed at various processing rates in a plastically deforming step.

FIG. 4 is a graph for illustrating the Vickers hardness measurement results of the rod-shaped bodies 20, which are deformed at various processing rates in the plastic deforming step and heat-treated at various temperatures. As is clear from FIG. 4, the heat treatment (recrystallization) temperature, at which the Vickers hardness is drastically lowered, depends on the processing rates. As the processing rate is increased, the heat treatment temperature is lowered. Therefore, in the case of performing the recrystallization in the heat treatment, the heat treatment temperature may be controlled depending on the processing rate.

In a case where the rod-shaped bodies 20 deformed at a processing rate of 15% and which have a recrystallization temperature of 700° C. and the same shape and size (a diameter of 5.5 mm and a height of 4 mm, and the same will apply hereinafter), were heat-treated at given temperatures of 700° C. to 800° C. to produce the plastically deformed bodies respectively, the graph of FIG. 5 was obtained. The graph illustrates the relation of the heat treatment temperature to the difference obtained by subtracting the coercivity in the direction parallel (at 0°) to the magnetic field from the coercivity in the direction perpendicular (at 90°) to the magnetic field in the plastically deformed bodies. In this case, the magnetic field has an intensity of 10 T.

Figure 5:
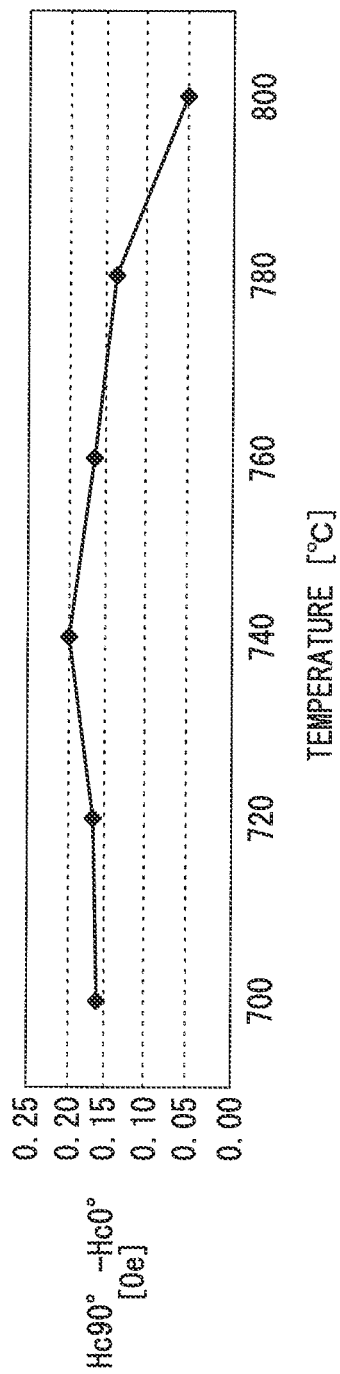
FIG. 5 is a graph for illustrating the relation of heat treatment temperature to difference between coercivities in directions perpendicular and parallel to a magnetic field, in a case where rod-shaped bodies having the same recrystallization temperature, shape, and size are heat-treated at various temperatures.

As is clear from FIG. 5, in the case where the rod-shaped bodies 20 having the recrystallization temperature of 700° C. were heat-treated at the temperatures of 700° C. to 800° C., the difference between the coercivity at 90° and the coercivity at 0° was caused. The coercivities were significantly different particularly at the temperatures of 720° C. to 780° C. Thus, the heat treatment temperature is preferably within a range from the recrystallization temperature to (the recrystallization temperature+100° C.), more preferably within a range from (the recrystallization temperature+20° C.) to (the recrystallization temperature+80° C.)

The retention time of the heat treatment is not particularly limited, and may be 1 to 5 hours, for example.

The results shown in FIG. 5 were obtained using a silicon steel prepared by adding 2% by mass of Si to Fe. It was confirmed that similar results were obtained also in the case of using an Fe—Al alloy.

Figure 6:
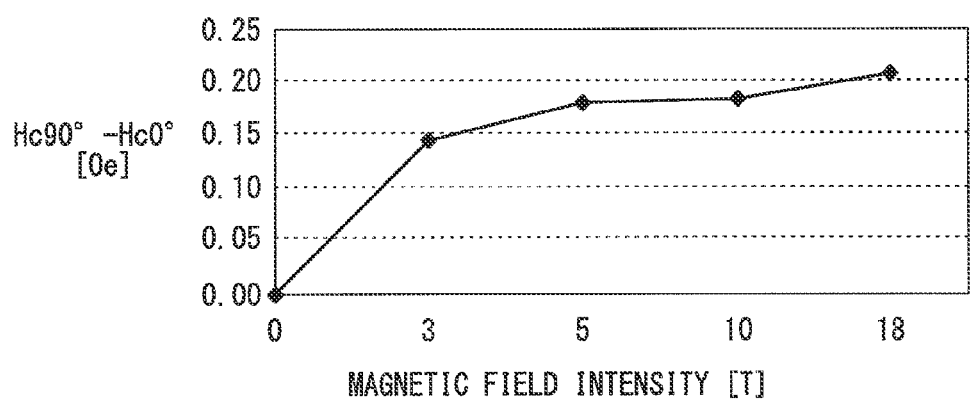
FIG. 6 is a graph for illustrating the relation of magnetic field intensity to difference between coercivities in directions perpendicular and parallel to a magnetic field, in a case where rod-shaped bodies having the same recrystallization temperature, shape, and size are heat-treated under various magnetic field intensities.
Figure 7:
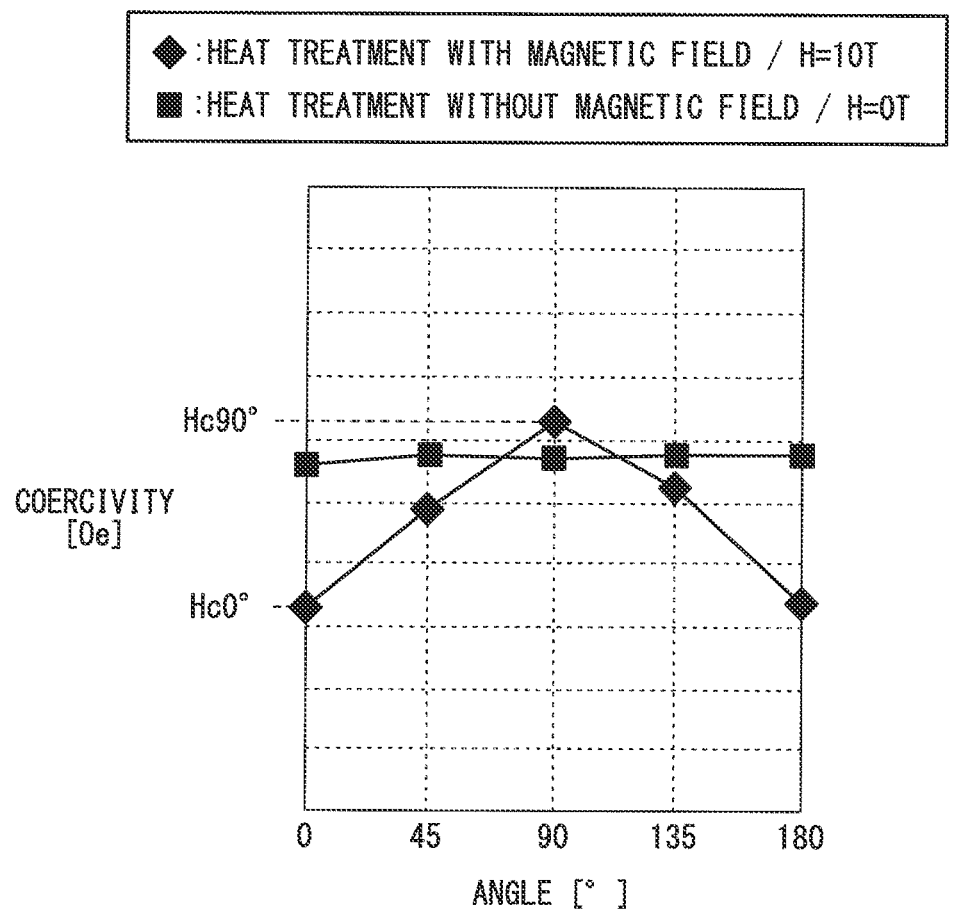
FIG. 7 is a graph for illustrating the relation between direction relative to a magnetic field and coercivity, in a case where rod-shaped bodies having the same recrystallization temperature, shape, and size are heat-treated in the presence and absence of the magnetic field.

In a case where the rod-shaped bodies 20 deformed at a processing rate of 15% and which have a recrystallization temperature of 700° C., were heat-treated under various magnetic field intensities to produce the plastically deformed bodies, the graph of FIG. 6 was obtained. The graph illustrates the relation of the magnetic field intensity to the difference between the coercivity in the direction perpendicular (at 90°) to the magnetic field and the coercivity in the direction parallel (at 0°) to the magnetic field in the plastically deformed bodies. In a case where the rod-shaped bodies 20 deformed at a processing rate of 15% and which have a recrystallization temperature of 700° C., were heat-treated at 720° C. in a magnetic field of 10 T to produce the plastically deformed bodies, the graph of FIG. 7 for illustrating the relation between the direction and coercivity (plotted by diamond symbols) was obtained. FIG. 7 also illustrates the relation between the direction and coercivity in plastically deformed bodies, obtained in a case where the heat treatment was carried out at 720° C. while the electromagnetic coil 26 was not energized (i.e. the magnetic field was not generated) (plotted by square symbols). As described above, the direction at 0° represents a direction parallel to the magnetic field, and the direction at 90° represents a direction perpendicular to the magnetic field.

As is clear from FIGS. 6 and 7, when the heat treatment is carried out in the presence of the magnetic field, a difference between the coercivity in the direction parallel to the magnetic field and the coercivity in the direction perpendicular to the magnetic field is caused, and thus the magnetic anisotropy is developed.

The magnetic-anisotropic plastically deformed body may have a desired shape other than the cylindrical shape. In this case, the rod-shaped body 20, which was obtained in the above manner, is subjected to a plastic deforming process, a cutting process, and/or a grinding process, etc., to obtain a processed body having a desired shape. Thereafter, the resultant processed body is heat-treated in the presence of the magnetic field in the same manner as above. Consequently, the magnetic-anisotropic plastically deformed body is produced with the desired shape.

The magnetic-anisotropic plastically deformed body can be used e.g. in a magnetic circuit of an electromagnetic valve (electromagnetic apparatus). The use will be described below.

Figure 8:
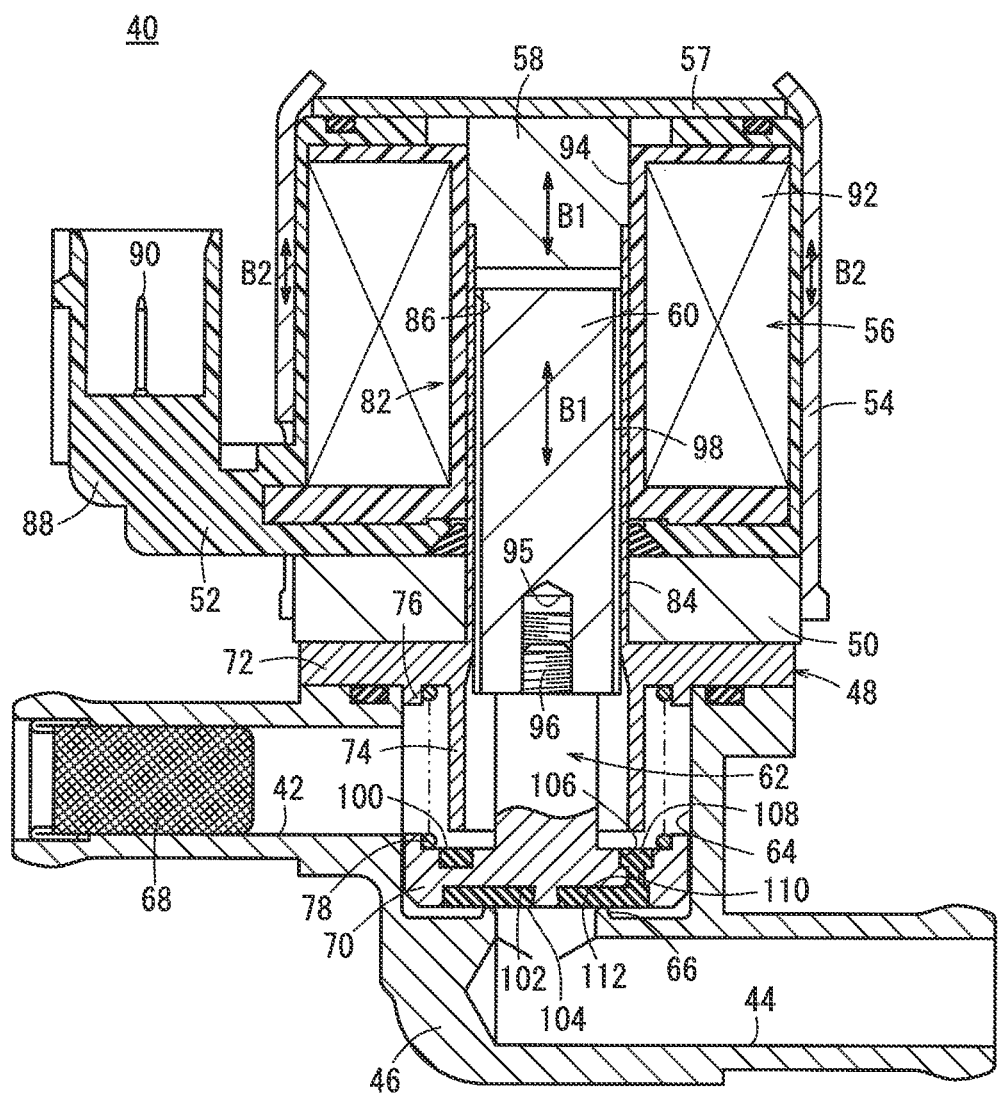
FIG. 8 is an overall schematic vertical cross-sectional view of an electromagnetic valve having a magnetic circuit containing a soft magnetic member made of a magnetic-anisotropic plastically deformed body according to the present invention.

FIG. 8 is an overall schematic vertical cross-sectional view of an electromagnetic valve 40. The electromagnetic valve 40 includes a valve body 46, a substantially cylindrical housing 54, and a solenoid 56 (magnetic circuit). The valve body 46 has an inlet port 42 and an outlet port 44. The housing 54 is connected to an upper portion of the valve body 46 through a guiding member 48, a plate member 50, and a cover member 52. The solenoid 56 is disposed in the housing 54.

Furthermore, a fixed core 58 and a movable core 60 (soft magnetic members) are located in the solenoid 56. The fixed core 58 is positioned on and fixed to a top wall member 57, which closes an upper opening of the housing 54. The movable core 60 is displaceably inserted into the guiding member 48, and is moved close to and away from the fixed core 58. An end of the movable core 60 is connected to a valve member 62.

The fixed core 58 and the movable core 60 have substantially cylindrical shapes, and are each made of the magnetic-anisotropic plastically deformed body 10a having the magnetization easy axis extending in the longitudinal direction (arrow B1 direction).

The valve body 46 is made of a metal material. Between the upstream inlet port 42 and the downstream outlet port 44, a valve seat 66 and a communication chamber 64 for communicating the inlet port 42 with the outlet port 44 are disposed.

The inlet port 42 projects from a side surface of the valve body 46 outward in the radial direction. A filter 68 is disposed in the inlet port 42, and the bottom of the filter 68 faces the communication chamber 64. In a case where a fluid supplied to the inlet port 42 contains dust or the like, the dust is removed by the filter 68. Thus, the dust is prevented from entering the communication chamber 64 in the electromagnetic valve 40.

The outlet port 44 projects from a side surface of the valve body 46 at a position that is angularly spaced by approximately 180° from the inlet port 42. For example, the outlet port 44 is connected to a tube (not shown) by a tube fitting member (not shown).

The valve seat 66 projects upward from a lower surface of the communication chamber 64, and has a predetermined length. A disc 70 of the valve member 62 is seated on and separated away from the valve seat 66.

The guiding member 48 has a flange 72, which is connected to an upper portion of the valve body 46. A stopper 74 and a fitting protrusion 76 are arranged on the lower surface of the flange 72 in this order from the inner circumferential side. The stopper 74 and the fitting protrusion 76 have hollow cylindrical shapes, are arranged at a predetermined radial distance, and project downward.

The stopper 74 extends downward from the lower surface of the flange 72. When the valve member 62 and the movable core 60 are displaced upward in the axial direction by the solenoid 56, the upper surface of the disc 70 abuts against the lower surface of the stopper 74 and comes to a stop at a displacement end position.

The outer diameter of the fitting protrusion 76 is substantially equal to the inner diameter of the communication chamber 64 in the valve body 46. Therefore, when the guiding member 48 is attached to the upper portion of the valve body 46, the guiding member 48 can be easily positioned with respect to the valve body 46 by inserting the fitting protrusion 76 into the communication chamber 64 such that the fitting protrusion 76 abuts against the inner surface of the communication chamber 64. Furthermore, the center of the movable core 60 placed in the guiding member 48 can be easily adjusted to the center of the valve seat 66 of the valve body 46.

A coil spring 78 is disposed between the guiding member 48 and the disc 70 of the valve member 62. An end of the coil spring 78 is interposed between the stopper 74 and the fitting protrusion 76.

A relatively long, thin cylindrical guiding portion 84 extends in the axis direction on an upper surface of the flange 72, and is inserted into a bobbin 82 to be described later. The diameter of the guiding portion 84 is slightly smaller than that of the stopper 74.

A guide hole 86 for guiding the movable core 60 displaced in the axis direction is formed in the guiding portion 84. The guiding portion 84 is inserted into the through hole of the plate member 50 and the bobbin 82 such that the outer circumferential wall of the guiding portion 84 abuts against the inner circumferential surface of the bobbin 82 and the through-hole of the plate member 50, and an end of the guiding portion 84 abuts against the lower surface of the fixed core 58.

The plate member 50 is made of a metal material having a magnetic isotropic property, has a ring shape, and is integrally connected to the upper portion of the guiding member 48. The guiding portion 84 of the guiding member 48 is inserted into the plate member 50.

The cover member 52 is connected to the upper portion of the plate member 50. A connector 88 is disposed on a side surface of the cover member 52, and is adapted to be connected to a power supply (not shown) for supplying a current to the solenoid 56. The connector 88 contains therein a metal material terminal 90, an end of which is exposed to outside. The terminal 90 is electrically connected to the bobbin 82 of the solenoid 56 through the inside of the cover member 52. Furthermore, the terminal 90 is connected to the power supply by a lead wire (not shown).

The solenoid 56 has the bobbin 82, the movable core 60, and the fixed core 58. The bobbin 82 has a ring shape and abuts against the inner circumferential wall of the cover member 52. An electromagnetic coil 92 is wound on the outer circumferential surface of the bobbin 82. The movable core 60 is located in the bobbin 82 displaceably in the axis direction. The fixed core 58 is positioned on and fixed to the top wall member 57, and faces the movable core 60. The bobbin 82, on which the electromagnetic coil 92 is wound, is integrally engaged with the inside of the cover member 52. Thus, the entire bobbin 82 is surrounded by the cover member 52.

An insert hole 94 is formed at and extends through a substantially center portion of the bobbin 82 along the axis direction. The fixed core 58 is inserted into the upper part of the insert hole 94, and the guiding portion 84 of the guiding member 48 is inserted into the lower part of the insert hole 94.

As described above, the fixed core 58 and the movable core 60 are each made of the magnetic-anisotropic plastically deformed body 10a having the substantially cylindrical shape. A screw hole 95 is formed in the lower end of the movable core 60, a screw 96 is formed on the valve member 62, and the screw 96 is screw-inserted into the screw hole 95, whereby the valve member 62 is connected to the movable core 60. In FIG. 8, reference numeral 98 denotes a V-groove which is formed in a side wall of the movable core 60.

The disc 70 of the valve member 62 is inserted into the communication chamber 64 with a predetermined clearance between the disc 70 and the inner circumferential surface of the communication chamber 64. A spring receiving portion 100 projects upward from the upper surface of the disc 70 by a predetermined length.

The valve member 62 is made of e.g., an inexpensive, highly corrosion-resistant, metal material such as a stainless steel.

An annular first mounting groove 102 having a predetermined depth is formed in the lower surface of the disc 70. A first sheet 104 made of an elastic material is disposed in the first mounting groove 102. Similarly, an annular second mounting groove 106 having a predetermined depth is formed in the upper surface of the disc 70. A second sheet 108 made of an elastic material is disposed in the second mounting groove 106. Preferred examples of the materials for the first sheet 104 and the second sheet 108 include rubbers.

The first sheet 104 is attached to a position at which the disc 70 abuts against the valve seat 66 when the disc 70 is seated on the valve seat 66. On the other hand, the second sheet 108 is attached to a position at which the upper surface of the disc 70 abuts against the end of the stopper 74 when the disc 70 is moved upward.

The first mounting groove 102 and the second mounting groove 106 communicate with each other by a through-hole 110 extending in the axis direction in the disc 70. The through-hole 110 is filled with a connection sheet 112 made of an elastic material, and the first sheet 104 and the second sheet 108 are integrally connected to each other by the connection sheet 112. Thus, the first sheet 104 and the second sheet 108 are formed by introducing the elastic material into the first mounting groove 102 and the second mounting groove 106 and solidifying the elastic material. For example, the elastic material is injected into the first mounting groove 102, and is introduced through the through-hole 110 into the second mounting groove 106. Consequently, the first sheet 104, the connection sheet 112, and the second sheet 108 can be integrally formed with ease, and can be efficiently attached by a simple process.

Furthermore, owing to the integrally forming process, the first and second sheets 104 and 108 are prevented from falling off from the first and second mounting grooves 102 and 106.

The coil spring 78 is interposed between the upper surface of the disc 70 and the lower surface of the flange 72 of the guiding member 48, and applies an elastic force to the valve member 62 in a direction to seat the valve member 62 on the valve seat 66. The coil spring 78 is guided along the axis direction by the outer circumferential surface of the stopper 74 of the guiding member 48. Therefore, the coil spring 78 is reliably guided by the stopper 74, and thus can be stretched and compressed along the axis direction without misalignment.

One end of the coil spring 78 is held between the stopper 74 and the fitting protrusion 76, so that the coil spring 78 is prevented from being separated from the lower surface of the flange 72. The other end of the coil spring 78 is located on the spring receiving portion 100 provided on the upper surface of the disc 70, so that the coil spring 78 is prevented from falling off from the disc 70.

The housing 54 is made of a metal material containing a soft magnetic substance. The magnetization easy axis of the metal material is oriented in the arrow B2 direction. Thus, the direction of the magnetization easy axis in the housing 54 is equal to those of the magnetization easy axes in the fixed core 58 and the movable core 60. Incidentally, the top wall member 57 is made of a soft magnetic substance having a magnetic isotropic property.

For example, the housing 54 can be obtained by processing (e.g. cutting or grinding) the magnetic-anisotropic plastically deformed body 10a into a cylindrical shape.

The electromagnetic valve 40 is basically constructed as described above. Operations and advantages of the electromagnetic valve 40 will be described below.

In FIG. 8, a current is not supplied to the electromagnetic coil 92. Therefore, the electromagnetic valve 40 shown in FIG. 8 is in an unexcited state. The unexcited state corresponds to a closed state, in which the disc 70 (the first sheet 104) of the valve member 62 connected to the end of the movable core 60 is seated on the valve seat 66, and the communication between the inlet port 42 and the outlet port 44 is blocked. Thus, the electromagnetic valve 40 is of a normally closed type.

In such an off state, electric current is supplied from the power supply (not shown) through the lead wire and the terminal 90 of the connector 88 to the electromagnetic coil 92. The electromagnetic coil 92 is excited by the energization, and accordingly the magnetic flux is generated such that it flows around from the electromagnetic coil 92 to the movable core 60 and back to the electromagnetic coil 92. Thus, the magnetic field is generated.

Then, the movable core 60 is displaced upward in the axis direction against the elastic force of the coil spring 78, and also the valve member 62 connected to the end of the movable core 60 is displaced upward. Consequently, the disc (the first sheet 104) of the valve member 62 is separated from the valve seat 66.

The magnetization easy axes of the fixed core 58 and the movable core 60 are oriented in the arrow B1 direction, and the magnetization easy axis of the housing 54 is oriented in the arrow B2 direction. Therefore, in this case, the direction of the magnetic flux (magnetic field) coincides with the directions of the magnetization easy axes of the fixed core 58, the movable core 60, and the housing 54.

Thus, the movable core 60 can be easily displaced as described above. Consequently, the time elapsing from the start of the energization to the start of displacement of the valve member 62 can be shortened.

When the second sheet 108 attached to the disc 70 abuts against the stopper 74 of the guiding member 48, the movable core 60 and the valve member 62 cannot be further displaced. Thus, the movable core 60 is located in the displacement end position. At this time, owing to the second sheet 108 made of the elastic material, the contact impact caused when the disc 70 is displaced to the displacement end position is relaxed, and the impact noise is also reduced.

When the disc 70 is separated from the valve seat 66 in this manner, the electromagnetic valve 40 is placed in an opened state. Then, the fluid is introduced from the inlet port 42, transferred through the clearance between the disc 70 and the inner circumferential surface of the communication chamber 64 into the valve body 46, and discharged through the outlet port 44 to the outside.

To stop the discharge of the fluid, the energization of the electromagnetic coil 92 by the power supply (not shown) may be stopped to bring the electromagnetic coil 92 into the unexcited state. Then, the magnetic flux (magnetic field) disappears, and the force for displacing the movable core 60 upward is eliminated.

At this time, the movable core 60 is moved downward by the elastic force of the coil spring 78, so that the second sheet 108 on the disc 70 of the valve member 62 is separated from the lower end surface of the stopper 74. As a result, the disc 70 is seated on the valve seat 66, and the communication between the inlet port 42 and the outlet port 44 is blocked. Thus, the electromagnetic valve 40 returns to the state shown in FIG. 8. The discharge of the fluid through the electromagnetic valve 40 is stopped in this manner.

When the energization of the electromagnetic coil 92 is stopped, the magnetic flux (magnetic field), which flows in the direction parallel to the directions of the magnetization easy axes of the fixed core 58, the movable core 60, and the housing 54, disappears. The higher magnetic permeability and the lower magnetic coercivity are achieved in the arrow B1 direction and the arrow B2 direction than in the other directions. Therefore, the magnetic field can be eliminated in a shorter time. Thus, also in this case, the movable core 60 can be easily displaced as described above. Consequently, the time elapsing from the stop of the energization to the start of displacement of the valve member 62 can be shortened.

As described above, since the magnetic-anisotropic, soft magnetic substance is used as the fixed core 58, the movable core 60, and the housing 54, and the orientation directions of the magnetization easy axes are aligned with the direction of the magnetic flux (magnetic field), the magnetic efficiency can be improved, and thus the response speed can be improved in the electromagnetic valve 40.

The fixed core 58 and the movable core 60 have relatively simple cylindrical shapes in this embodiment. Therefore, unlike the conventional techniques, the magnetic-anisotropic plastically deformed body 10*a* can be used as the fixed core 58 and the movable core 60 without the need for a particular processing for forming the plastically deformed body 10*a* into a rod shape. In other words, in this embodiment, it is not necessary to perform the procedures of radially arranging unidirectional electromagnetic steel sheets, stacking the sheets, or bonding the sheets to a base by an adhesion. Thus, the electromagnetic valve having excellent durability can be produced at low cost without such complicated procedures.

The housing 54 can be produced by plastically forming a rod-shaped body 20 having a substantially cylindrical (rod) shape into a hollow cylindrical shape and then by subjecting the formed body to a predetermined heat treatment.

Other specific examples of the apparatuses containing the magnetic circuit using the soft magnetic member of the magnetic-anisotropic plastically deformed body include electromagnetic actuators, linear solenoid valves, fuel injection valves, transformers, motors, and the like. The present invention is not particularly limited to the examples, and the magnetic-anisotropic plastically deformed body can be used in various soft magnetic components.

Though the silicon steel or the Fe—Al alloy is used as the soft magnetic substance in the above embodiment, the soft magnetic substance is not particularly limited thereto.

While the invention has been particularly shown and described with reference to a preferred embodiment, it will be understood that variations and modifications can be effected thereto by those skilled in the art without departing from the spirit and scope of the invention as defined by the appended claims.

What is claimed is:

1. A magnetic-anisotropic plastically deformed body comprising a plastically deformed body obtained by plastic deformation of a single material containing a soft magnetic substance into a shape other than a flat plate shape, the plastically deformed body exhibiting a magnetic anisotropy.

2. The magnetic-anisotropic plastically deformed body according to claim 1, having one magnetization easy axis oriented in an arbitrary direction, thereby exhibiting a uniaxial magnetic anisotropy.

3. The magnetic-anisotropic plastically deformed body according to claim 1, having a crystal grain size corresponding to a grain size number of 3 to 9.

4. The magnetic-anisotropic plastically deformed body according to claim 1, comprising a silicon steel or an Fe—Al alloy.

5. The magnetic-anisotropic plastically deformed body according to claim 1, having a rod shape.

6. The magnetic-anisotropic plastically deformed body according to claim 1, obtained by plastically deforming the single material and subjecting the deformed material to a heat treatment in the presence of a magnetic field.

7. A method for producing a magnetic-anisotropic plastically deformed body, the magnetic-anisotropic plastically deformed body comprising a soft magnetic substance and exhibiting a magnetic anisotropy, the method comprising the steps of:
   plastically deforming a single material containing the soft magnetic substance to obtain a rod-shaped body; and
   subjecting the rod-shaped body or a shaped body obtained by processing the rod-shaped body into a shape other than a flat plate shape, to a heat treatment in the presence of a magnetic field to achieve the magnetic anisotropy, thereby obtaining the magnetic-anisotropic plastically deformed body.

8. The method according to claim 7, wherein the heat treatment is carried out within a temperature range from a recrystallization temperature to (the recrystallization temperature +100° C.)

9. The method according to claim 7, wherein in the step of plastically deforming the single material, the single material is plastically deformed at a processing rate of 10% to 40%.

10. The method according to claim 7, wherein the magnetic-anisotropic plastically deformed body has one magnetization easy axis oriented in an arbitrary direction and exhibits a uniaxial magnetic anisotropy.

11. The method according to claim 7, wherein the magnetic field has an intensity of 0.5 T or more.

12. The method according to claim 7, wherein the single material comprises a silicon steel or an Fe—Al alloy.

13. The method according to claim 7, wherein the rod-shaped body is subjected to the heat treatment in the presence of the magnetic field, thereby to obtain the magnetic-anisotropic plastically deformed body having a rod shape.

14. An electromagnetic apparatus comprising a magnetic circuit, the magnetic circuit containing an electromagnetic coil for generating a magnetic field when the electromagnetic coil is energized, the magnetic field disappearing when the energization is stopped, and a soft magnetic member which is magnetized and demagnetized respectively by the generation and disappearance of the magnetic field,
   wherein the soft magnetic member is a plastically deformed body obtained by plastic deformation of a single material containing a soft magnetic substance into a shape other than a flat plate shape, and the plastically deformed body is a magnetic-anisotropic plastically deformed body exhibiting a magnetic anisotropy.

15. The electromagnetic apparatus according to claim 14, wherein the magnetic-anisotropic plastically deformed body has one magnetization easy axis and exhibits a uniaxial magnetic anisotropy.

16. The electromagnetic apparatus according to claim 14, wherein the magnetic-anisotropic plastically deformed body has a crystal grain size corresponding to a grain size number of 3 to 9.

17. The electromagnetic apparatus according to claim 14, wherein the magnetic-anisotropic plastically deformed body comprises a silicon steel or an Fe—Al alloy.

18. The electromagnetic apparatus according to claim 14, wherein the magnetic-anisotropic plastically deformed body is obtained by plastically deforming the single material and subjecting the deformed material to a heat treatment in the presence of a magnetic field.

19. The electromagnetic apparatus according to claim 14, wherein the electromagnetic apparatus is an electromagnetic valve having a fixed core and/or a movable core containing the magnetic-anisotropic plastically deformed body.

20. The electromagnetic apparatus according to claim 14, wherein the electromagnetic apparatus is an electromagnetic valve having a housing containing the magnetic-anisotropic plastically deformed body.

\* \* \* \* \*